(12) United States Patent
Chen

(10) Patent No.: US 8,417,069 B2
(45) Date of Patent: Apr. 9, 2013

(54) MULTI DIMENSION HIGH SECURITY COMMUNICATION OVER MULTI MODE FIBER WAVEGUIDE

(75) Inventor: David Zhi Chen, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 731 days.

(21) Appl. No.: 12/495,506

(22) Filed: Jun. 30, 2009

(65) Prior Publication Data
US 2010/0329693 A1 Dec. 30, 2010

(51) Int. Cl.
*G02F 1/295* (2006.01)
(52) U.S. Cl.
USPC .............................................................. 385/4

(58) Field of Classification Search .................... None
See application file for complete search history.

(56) References Cited

U.S. PATENT DOCUMENTS

| | | | |
|---|---|---|---|
| 7,486,705 B2* | 2/2009 | Shah et al. ..................... | 372/25 |
| 2010/0173250 A1* | 7/2010 | Scharnweber ................. | 430/322 |
| 2010/0221009 A1* | 9/2010 | Etemad et al. ................. | 398/74 |
| 2010/0329670 A1* | 12/2010 | Essiambre et al. ............. | 398/43 |
| 2011/0243490 A1* | 10/2011 | Ryf .................................. | 385/1 |

* cited by examiner

*Primary Examiner* — Eric Wong

(57) ABSTRACT

A system may comprise a single wavelength laser; a modulator optically coupled to said laser; a length of multi-mode fiber optically coupled to said modulator; and a phase mask optically coupled to said fiber. The phase mask may be configured to filter out modes other than a selected mode.

14 Claims, 8 Drawing Sheets

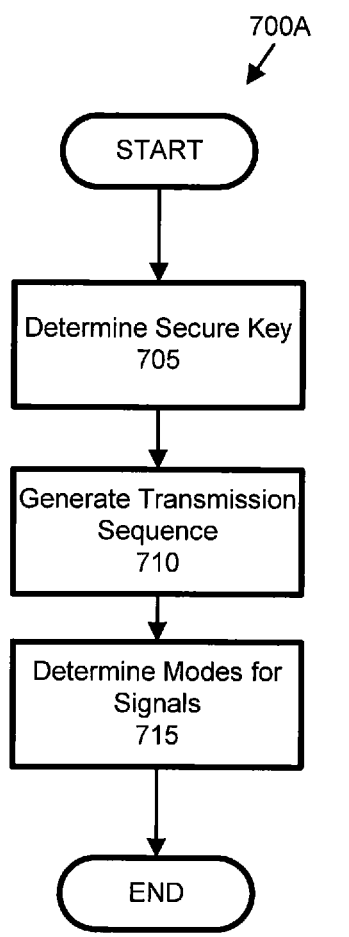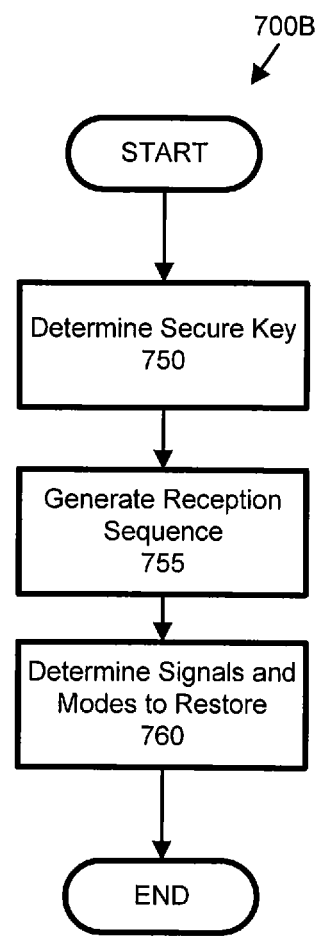
FIG. 7A
FIG. 7B

MULTI DIMENSION HIGH SECURITY COMMUNICATION OVER MULTI MODE FIBER WAVEGUIDE

BACKGROUND

Fiber optic cables have advantages over electrically conductive wires. For example, fiber optic cables may allow for greater travel distances with lower losses. As another example, fiber optic cables are immune to electromagnetic interference. Accordingly, fiber optic cables are increasingly being used to send and receive voice, video, image, and other data transmissions. Thus, given their distinct advantages, it may be desirable to further increase the range, bandwidth, and security of transmissions across fiber optic cables.

BRIEF DESCRIPTION OF THE DRAWINGS

FIG. 7A illustrates an exemplary process providing further details regarding modulating signals onto corresponding modes.

FIG. 7B illustrates an exemplary process providing further details regarding decoding signals from received modes.

DETAILED DESCRIPTION

Figure 1A:
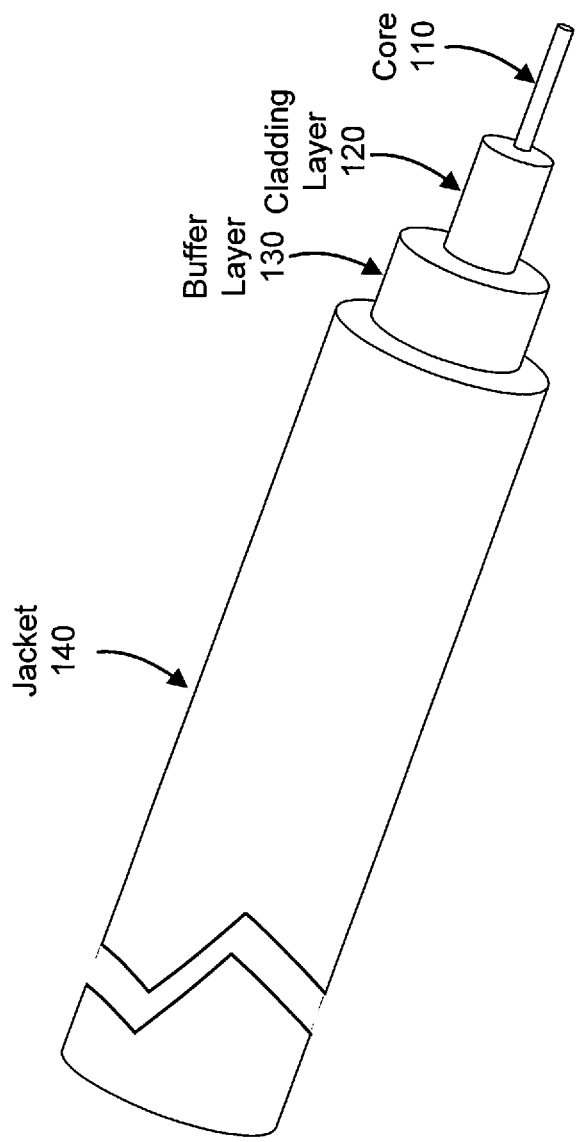
FIG. 1A illustrates an exemplary fiber optic cable.

FIG. 1A illustrates an exemplary fiber optic cable. Generally, a fiber optic cable is a fiber designed to carry or to guide light along its length. A fiber optic cable may comprise various layers and designs, and may include a core 110 for guiding light, a cladding layer 120 surrounding the core 110, a buffer layer 130 surrounding the cladding layer 120, and a jacket 140 surrounding at least one buffer layer 130.

The core 110 of a fiber optic cable is a thin center of the fiber through which light may travel. Accordingly, the core 110 is composed of a material through which light may pass, typically a glass or plastic. The specific properties of the fiber optic core 110 may be specified in terms of a radius and an index of refraction of the core material.

The cladding layer 120 may surround the core 110, and may reflect light back into the core layer. The cladding layer 120 may be composed of a glass or plastic dielectric material with a specified index of refraction, generally less than the index of refraction of the core material. In addition to adding mechanical strength, the cladding layer 120 may protect the fiber from absorbing contaminants, may reduce the scattering loss of light at the surface of the core, and may reduce the loss of light from the core 110.

The buffer layer 130 or buffer coating layer may surround and further protect the core 110 and cladding layers 120 from damage, moisture, and physical damage such as abrasions. The buffer layer 130 is typically made from a durable plastic. The jacket 140 may comprise at least one buffer layer 130 (although only one buffer layer 130 is shown in FIG. 1A), and may group and further protect the bundle of one or more fibers from damage. In some examples, hundreds or thousands of optical fibers may be arranged in a bundle within the jacket 140 of an optical cable.

With regard to the operation of the fiber optic cable, light may be retained within the core 110 of the fiber optic cable by total internal reflection, which causes the fiber to act as a waveguide. Generally, total internal reflection is an optical phenomenon that occurs when a ray of light strikes a medium boundary at an angle larger than a critical angle with respect to the normal to the surface. If the refractive index is lower on the other side of the boundary, no light may pass through and the light may be reflected. Accordingly, a critical angle may be defined as a least angle of incidence at which total internal reflection occurs.

Such a boundary may be formed between the core 110 and cladding layer 120 of a fiber optic cable, allowing for light to propagate along the fiber. Thus, bound rays may enter the fiber optic cable at an angle greater than the critical angle, and may propagate along the axis of the fiber through the core due to total internal reflection. Rays that enter at other angles may be referred to as unbound rays, and are refracted out of the fiber core and do not propagate along the fiber. Thus, a light ray incident on the fiber core must be within an acceptance cone defined by the critical angle in order to propagate along the fiber.

However, not all angles within the acceptance cone will, in fact, propagate down the fiber. In contrast, the geometry of the fiber optic cable and forward and backward traveling waves on the fiber may cause constructive and destructive wave interference. This interference may allow only certain angles of entering light, or modes, to propagate along the optical fiber. For example, if propagating wavefronts on the fiber are not in phase, then the wavefronts may disappear because of destructive interference and accordingly will not propagate. Additionally, wavefronts that are in phase may interfere with propagating wavefronts that are out of phase. Due to at least these types of interference, only a finite number of modes, or paths, may propagate along the fiber.

An example of a mode that may pass along the fiber is the mode may be created from rays that enter the fiber geometrically straight on axial. Such a mode may be called the fundamental mode. Other modes, such as a second mode or a third mode, may be created by rays that enter the fiber off axis (but within the acceptance cone), and thus propagate along the fiber due to total internal reflection. The specific number of modes that may propagate along a fiber may be defined or modeled according to the radius of the core 110 of the fiber, the frequency of the ray of entering light, and the refractive indices of the core 110 and cladding layers 120.

A multi-mode fiber (MMF) is an optical fiber that supports multiple propagation paths or transverse modes. A single mode fiber (SMF) is an optical fiber that can only support a single mode of transmission, i.e., the fundamental mode.

However, MMF and SMF are relative terms. As the number of modes that propagate along a fiber may vary according to the radius of the core 110 of the fiber and the frequency of the ray of entering light, a fiber may be multi-mode for one frequency of light and single mode for another frequency of light. A cutoff wavelength of a fiber may be defined as the wavelength beyond which a fiber supports only a single mode of propagation. For example, a fiber may be a SMF for a wavelength of 1550 nanometers (nm), but may be a MMF for a wavelength of 510 nm.

Additionally, the diameter of the core 110 of a fiber affects the number of modes that may be propagated along the fiber. For example, a typical SMF for 1550 nm wavelengths may have a core diameter of 8.3 to 10 microns to ensure one mode of transmission. A typical MMF for 1550 nm wavelengths may have a core diameter of approximately 50 to 100 microns. Common types of MMF may support the sending of approximately 18-19 different modes of transmission.

With regard to MMF, because the mode field is much bigger, the fiber may tunnel more light energy. Moreover, as MMF is relatively easy to manufacture, MMF is relatively less expensive than SMF. In addition, MMF is more forgiving on an optic source. For single-mode fiber, the light source has to be more precise and has to better control the coherent property of the lasers. Therefore use of SMF requires more precise optic sources and receivers, further increasing the cost of SMF over MMF.

However, as a downside, unlike SMF, MMF is susceptible to modal dispersion. Accordingly, due to modal dispersion MMF is typically only used for short-distance communication links, while SMF may be used for much longer communication links.

Dispersion may generally defined as the spreading of light pulses as the pulses propagate down an optical fiber. This spreading of the light pulses may cause the pulses to broaden, and eventually overlap, rendering the pulses unreadable by a receiver.

There are two main types of dispersion: chromatic dispersion and modal dispersion. Each of them is relevant with regard to transmission of pulses down fiber optic cables.

Chromatic dispersion is a type of spreading of light pulses propagating down a fiber due to a difference in light velocity for different wavelengths of light. An example of chromatic dispersion is the familiar rainbow of light produced by shining a beam of light through a prism. Generally, one cause for chromatic dispersion is the index of refraction of a fiber core 110 being different for different wavelengths of light propagating down the fiber. Chromatic dispersion is typically not a significant issue except for very long lengths of fiber; however, chromatic dispersion is an issue for both MMF and SMF.

Modal dispersion is a type of spreading of light pulses propagating down a fiber due to propagation velocity of the different modes being different for the different modes. As the bound rays for one mode enter the fiber at a different angle from those of another mode, each mode travels a different distance down the fiber as the mode propagates. This difference in distance translates into the different modes arriving at different times at a receiver. As the modes arrive at different times, this may smear the pulses and render a transmitted signal unreadable by a receiver. Importantly, modal dispersion is only an issue for MMF, but not for SMF, because, by definition, a SMF only transmits a single mode.

As SMF fiber, transmitters, and receivers may be more expensive than MMF systems, techniques have been developed to increase the throughput of SMF fiber. One such technique is wavelength division multiplexing (WDM).

WDM is a technology whereby multiple frequencies of light are used to transmit multiple signals down a single fiber optic cable. A multiplexer may be used at a transmitter to join signals of various frequencies together for transmission, and a demultiplexer may be used at a receiver to split the frequencies back apart for further use. Indeed, a WDM system may define a set channel spacing across a frequency domain that may be used to define the frequencies that are transmitted down a fiber. Accordingly, such a system may allow for the capacity of a fiber to be greatly expanded. For example, a coarse WDM system may provide for 16 transmission channels over C-band light frequencies, while a dense WDM system may provide 40 channels with 100 GHz spacing or 80 channels with 50 GHz spacing. Such WDM systems may greatly increasing the throughput of a fiber optic system without having to run additional SMF cables.

When using WDM on SMF, a system may need to compensate for chromatic dispersion, but not modal dispersion. Compensating for chromatic dispersion, a SMF cable may be used in a WDM system to provide for transmission across a large propagation distance, and even propagation distances of thousands of kilometers are feasible.

However, modal dispersion is non-linear and accordingly systems cannot readily compensate for it. Thus, without compensation for modal dispersion, the transmission distance may be limited to short distances, for example up to about one kilometer, although distances of tens or hundreds of meters are more typical. Accordingly, due to the smearing effects of modal dispersion, traditional WDM technologies are presently unusable on MMF for long range transmissions. Thus, even with the advantages of fiber optics over electrical wires, communication over MMF has been slowly being replaced by SMF due to the nature of the difficulties in handing modal dispersion.

Figure 1B:
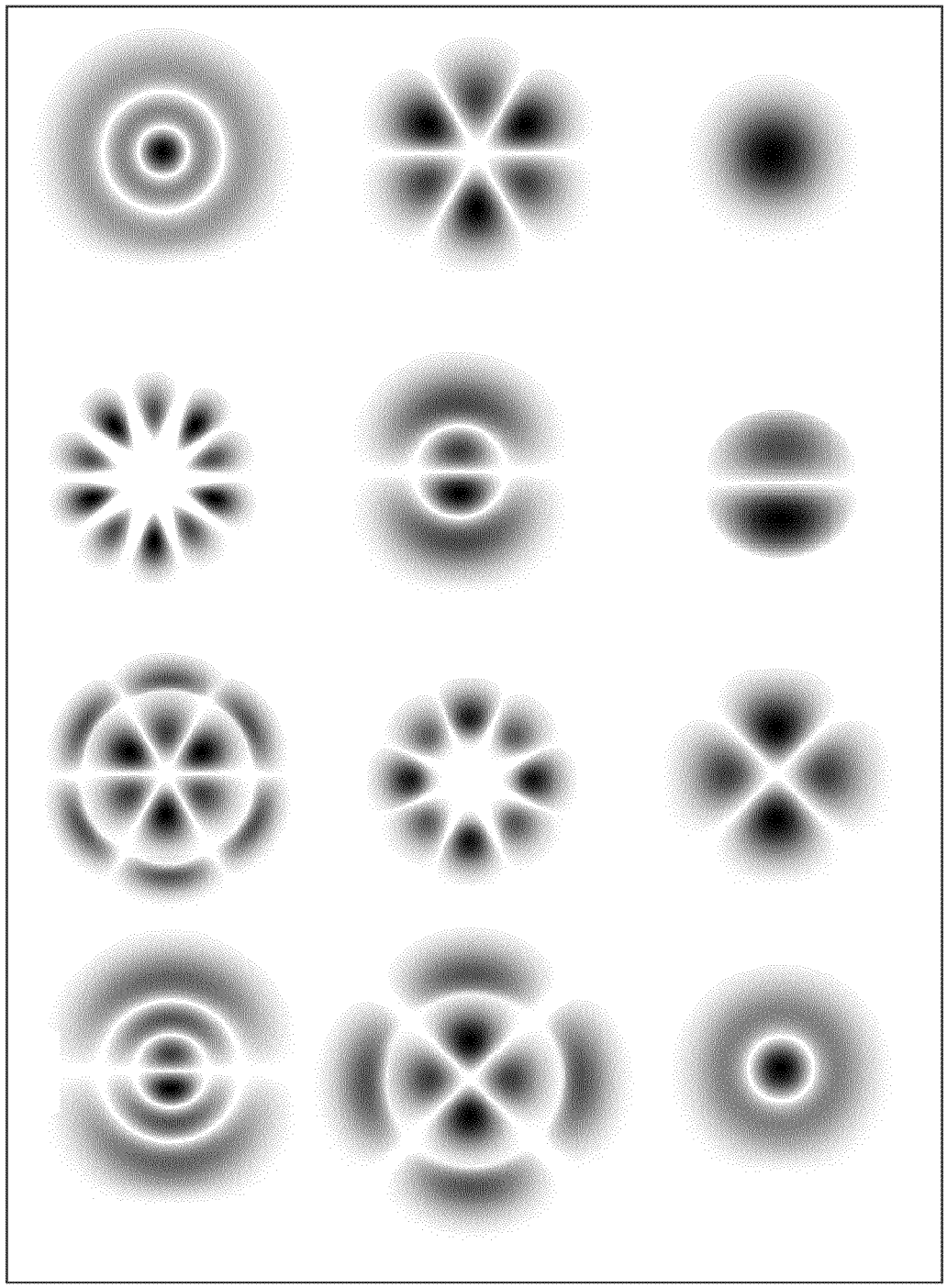
FIG. 1B illustrates exemplary cylindrical transverse modes that may be propagated along a multi-mode fiber.

FIG. 1B illustrates exemplary cylindrical transverse modes that may be propagated along a MMF. As discussed above, multiple modes may traverse a length of MMF. As illustrated in the figure, each mode has a unique particular pattern of intensity distribution. It should be noted that the modes shown in FIG. 1B are merely illustrative, and more, fewer, or different modes than those shown are possible. Generally, mode intensity patterns may be described by a combination of a Gaussian beam profile with a Laguerre polynomial, and may be referred to according to integral values of radial and angular mode. As indicated by the exemplary intensity distributions illustrated in the figure, brighter areas correspond to areas of greater intensity for each mode dispersion field, where depending on the mode, different areas may accumulate intensity or may not accumulate intensity. For example, the fundamental mode may appear as a circle of intensity in the middle of a fiber, while other modes may appear, for example, as multiple round ovals, or as concentric rings.

Because these patterns of intensity are unique for each mode and are able to be computed, a special phase mask filter may be designed that exactly matches the pattern of intensity for a particular mode. The phase mask may be designed to allow through light only according to the unique intensity pattern for the particular mode for which it is designed. Through use of a phase mask that exactly matches the intensity distribution for the mode field of distribution, the phase mask may be used to filter out all but a single mode, preventing the passage of other unnecessary or unwanted modes. Thus, a phase mask may be designed that selectively allows only the chosen mode to pass.

Using phase masks, a WDM system may be designed that takes advantage of the modes that form in a length of MMF, rather than being limited to short runs by the smearing effects caused by modal dispersion inherent in a MMF. Such a WDM system may be based on optical mode distribution rather than using wavelength or frequency domain separation. For example, the system may use multiple modes with only a single wavelength on a MMF.

Phase masks may be used to multiplex and demultiplex multiple modes of a frequency on a MMF in a manner analogous to how multiple frequencies of light may be multiplexed for propagation along a SMF in a traditional WDM. Accordingly, multiple modes each may be used as separate channels for propagation of signals through a MMF. Moreover, because each mode may be specifically filtered out using a phase mask at the receiver, modal dispersion is accounted for and accordingly does not limit transmission distance over the MMF.

Further, in some systems, mathematical random sequences may be used to generate a secure key to use over the MMF WDM system, where the secure key be used along with a mathematical algorithm to allow for selective switching of a transmission over the supported MMF WDM modes. Additionally, exemplary systems may further use and take advantage of mode delay inherent in the modal dispersion for securing the key and the transmissions from interception.

Figure 2:
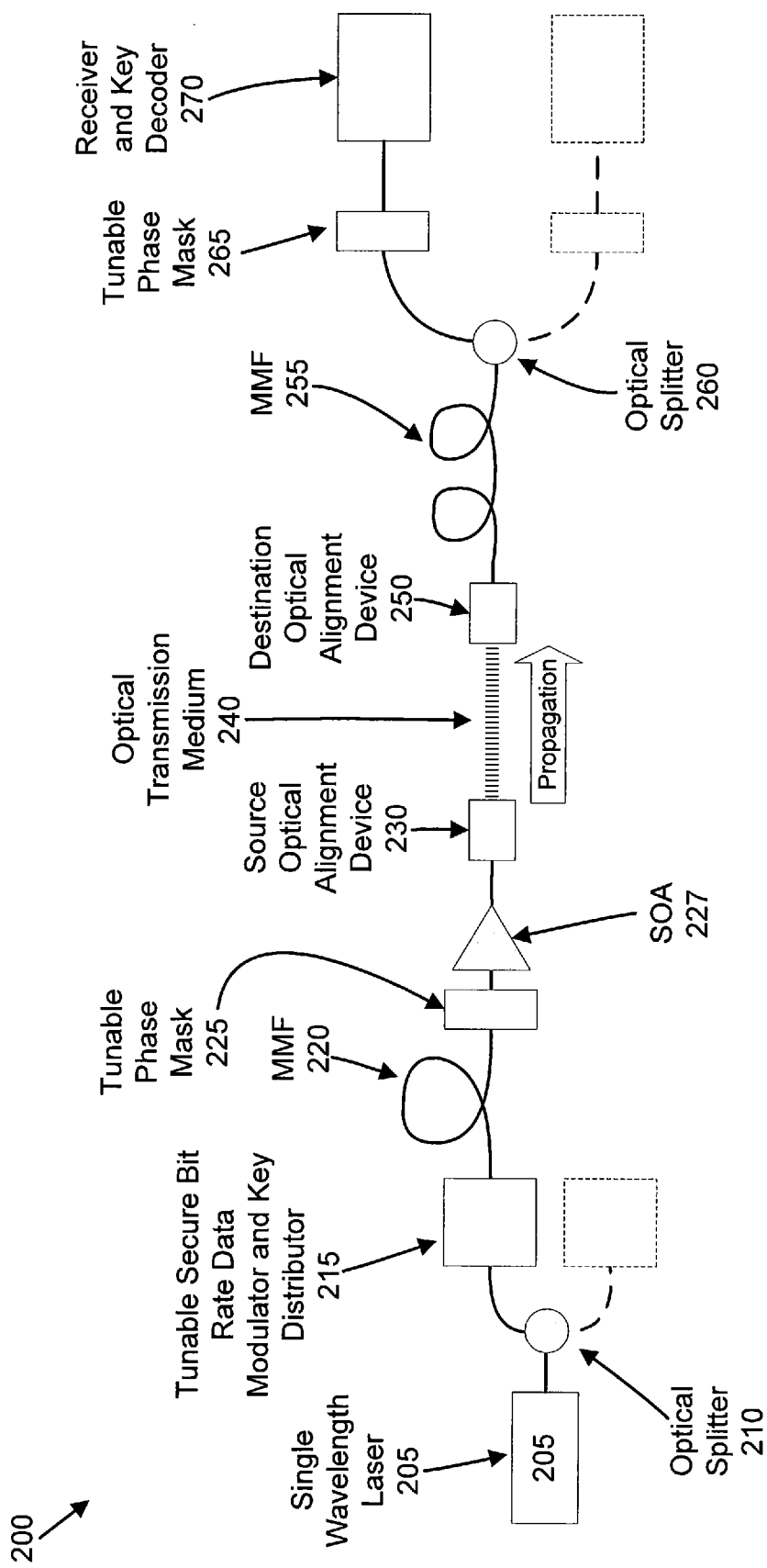
FIG. 2 illustrates an exemplary communications system for the propagation of a signal over a specified mode.

FIG. 2 illustrates an exemplary communications system 200 for the propagation of a signal over a specified mode. System 200 may take many different forms and include multiple and/or alternate components and facilities. While an exemplary system 200 is shown in FIG. 2, the exemplary components illustrated in the figure are not intended to be limiting. Indeed, additional or alternative components and/or implementations may be used.

As illustrated in the figure, system 200 includes a single wavelength laser 205. A single wavelength laser 205 is a device that may emit light or other forms of electromagnetic radiation through simulated emission. A laser, such as single wavelength laser 205, may provide a spatially coherent low-divergence beam of light energy for a particular band of wavelengths. Accordingly, single wavelength laser 205 may provide a beam of coherent light and function as a light source for system 200. For example, the single wavelength laser 205 may be a 1550 nm laser, a light-emitting diode (LED) laser, etc.

Single wavelength laser 205 may be optically coupled to an optical splitter 210, such as through a fiber optic cable or through free space transmission. The optical splitter 210 may split the energy of a beam of light into multiple beams of light through energy divergence.

A tunable secure bit rate data modulator and key distributor (SDMKD) 215 may be optically coupled to the optical splitter 210. SDMKD 215 may vary the amplitude and phase of a light beam to facilitate the transmission of data on the light beam. SDMKD 215 may be used to modulate a beam to carry video, voice, data, secure keys, or any other form of data transmission. Additionally, SDMKD 215 may modulate the beam at a selected rate, such as 2.5 Gbit/s, 10 Gbit/s, 40 Gbit/s, among other rates.

A length of MMF 220 may be optically coupled to SDMKD 215. Once a light beam is injected into the MMF 220, the MMF 220 automatically forms a waveguide, and accordingly the light beam propagates through the MMF 220 according to the modes present in the MMF 220 for the wavelength of light of the beam. Although various lengths of MMF 220 are possible, MMF 220 need only be long enough to allow for the modes to form and propagate. Accordingly, the length of MMF 220 may be relatively short.

A tunable phase mask 225 may be optically coupled to the MMF 220. As discussed above, a phase mask may be used to filter out unwanted modes, and to pass only a desired mode. In some examples, tunable phase mask 225 may be constructed of a liquid crystal, a multi-dimensional liquid crystal, or a multi-dimensional lens specifically designed to exactly match a desired the specified mode pattern. Tunable phase mask 225 may be designed using a computerized model of a specific mode, and according to the model may thus pass only the mode of light of the beam corresponding to the desired mode. Accordingly, tunable phase mask 225 may be used to select for a specific mode out of the modes propagating through the MMF 220 to which it is optically coupled. The tunable phase mask 225 may further be tuned to change the parameters of the desired mode or to select from one of a plurality of modal dispersions the tunable phase mask 225 is capable of selectively passing. In other examples, fixed phase masks that are not tunable may be used to filter out unwanted modes.

In some examples, a semiconductor optical amplifier (SOH) 227 may be inserted after tunable phase mask 225 and before a source optical alignment device 230 because of attenuation of the light beam being passed. After the light passes through the optical splitter 210 and has energy divergence, the signal may become attenuated. Moreover, once the light beam passes through a modulator such as SDMKD 215 and then through a length of MMF 220, further attenuation may occur, causing the energy of the light beam to be damped by a significant margin. Accordingly, an SOH 227 may be used to ensure that there is adequate power in the light beam for further use, including transmission through a further medium.

A source optical alignment device 230 may be optically coupled to tunable phase mask 225 (in some examples, via SOH 227). Source optical alignment device 230 may be, for example, a telescope, and may be configured to shoot a beam of light into an optical transmission medium 240 according to the requirements for the specific mode being propagated. By controlling the incident angle into the optical transmission medium 240, the desired mode may be better preserved. Accordingly, an optical alignment device may be specially configured to allow for an acceptable match to perform the free space propagation.

In some examples, the source optical alignment device 230 may be optically coupled to a destination optical alignment device 250 over free space. Generally, in free space optics systems, wavefronts may be transmitted through the air from a transmitter (such as free source optical alignment device 230) to a receiver (such as destination optical alignment device 250), without the transmissions being enclosed in a wave guide. Instead of making use of a wave guide, free space optical transmission requires a clear line-of-sight path between the source optical alignment device 230 and the destination optical alignment device 250. Thus, to facilitate transmission, the source optical alignment device 230 and destination optical alignment device 250 are selectively positioned to face one another and form an information link. In some examples the source optical alignment device 230 and destination optical alignment device 250 are fine-tuned with small angle adjustments and/or additional optics to allow for a higher quality link.

Accordingly, source optical alignment device 230 may be used to transmit a light beam over free space without a waveguide (e.g. without use of SMF, MMF, etc.). where free space propagation matching the numerical angle of the chosen mode may be used as an optical transmission medium 240. Additionally, a destination optical alignment device 250 may be used to receive the free space transmission sent over the free space optical transmission medium 240 by source optical alignment device 230.

In other examples, the source optical alignment device 230 may be optically coupled to an optical transmission medium 240 comprising a length of MMF, or any other medium capable of optical transmission and preferably mode preservation. Accordingly, source optical alignment device 250 may be used to align a received beam of light propagated over optical transmission medium 240 at an appropriate incident angle for the selected mode being transmitted, and may shoot the beam of light into the transmission medium.

Destination optical alignment device 250 may further be optically coupled to MMF 255, and may be, for example, a telescope configured to provide the proper alignment of the light beam to enter MMF 255 for the specific mode being propagated. In general, similar to how different modes have correspondingly different incident angles into a medium, different modes also may have correspondingly different incident angles out of a medium. Accordingly, destination optical alignment device 250 may be used to align a received beam of light propagated over optical transmission medium 240 at an appropriate incident angle for the selected mode being transmitted, and may accordingly shoot the beam of light into MMF 255.

MMF 255 may carry the light beam to optical splitter 260, to which MMF 255 is optically coupled, where optical splitter 260 may split the light beam. Additionally, optical splitter 260 may be optically coupled to a tunable phase mask 265 corresponding to the selected mode being transmitted. As each leg exiting the optical splitter 260 may include all of the modes being propagated, and as multiple modes may be propagated at once, a tunable phase mask 265 may be required for each leg. Accordingly, tunable phase mask 265 may be used to filter out all but a desired mode from a leg of the split out fiber. Tunable phase mask 265 may be designed to pass only the mode of light of the beam corresponding to the desired mode as originally selected by tunable phase mask 225.

Receiver and key decoder (RKD) 270 may be optically coupled to tunable phase mask 265, may receive the light beam for the desired mode, and may decode the light beam into a resultant signal, such as an electrical signal. The resultant signal may reproduce a signal modulated by a SDMKD 215.

Accordingly, through use of system 200, a signal may be optically propagated from SDMKD 215 to RKD 270 over a specified mode of a wavelength of light and over various transmission media. Moreover, through use of tunable phase masks 225 and 265, the transmitted signal is not spread by modal dispersion, because only one specific mode is transmitted and received.

Figure 3:
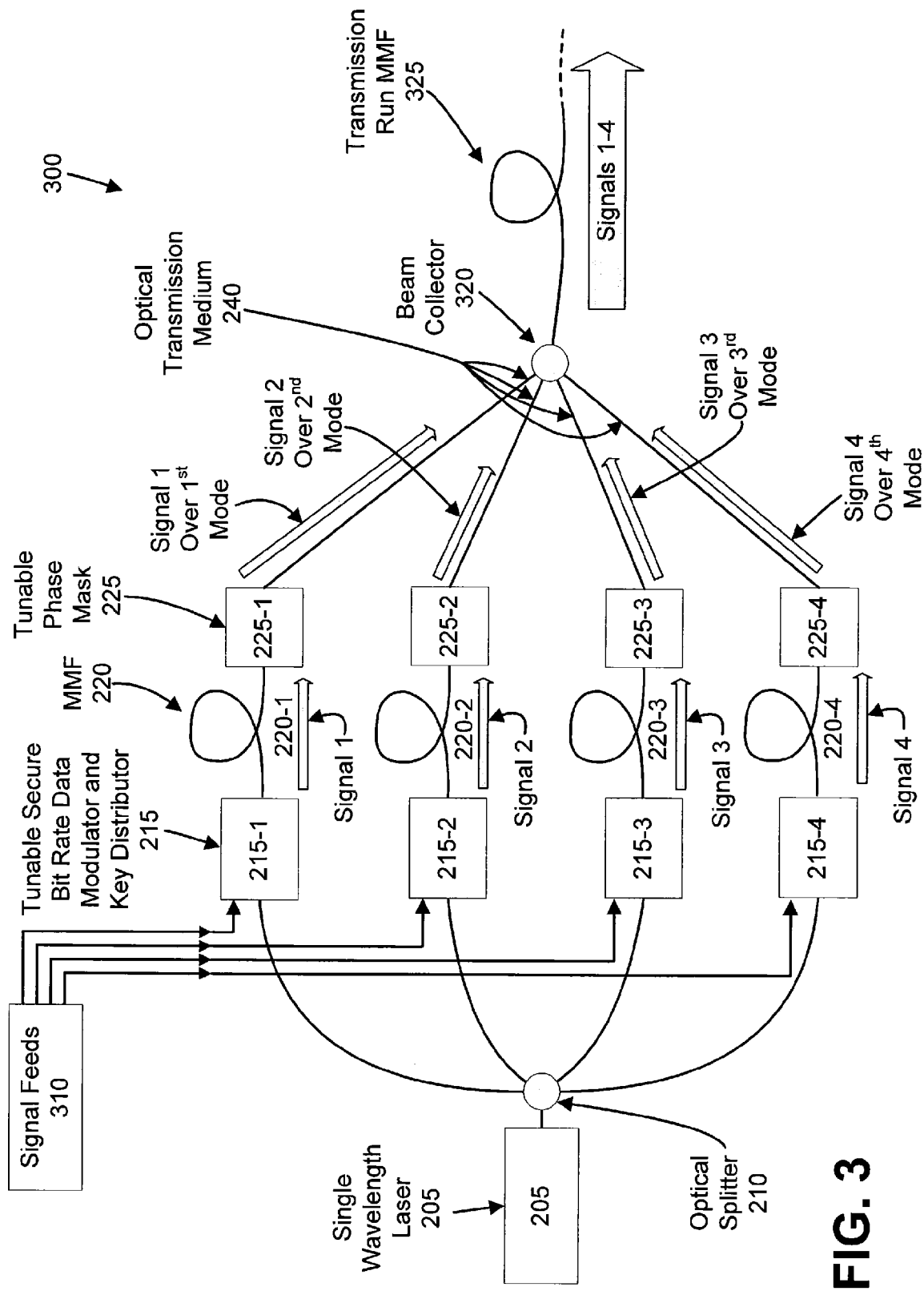
FIG. 3 illustrates an exemplary communications system including multiple modulator devices for the propagation of multiple signals over multiple modes.
Figure 4:
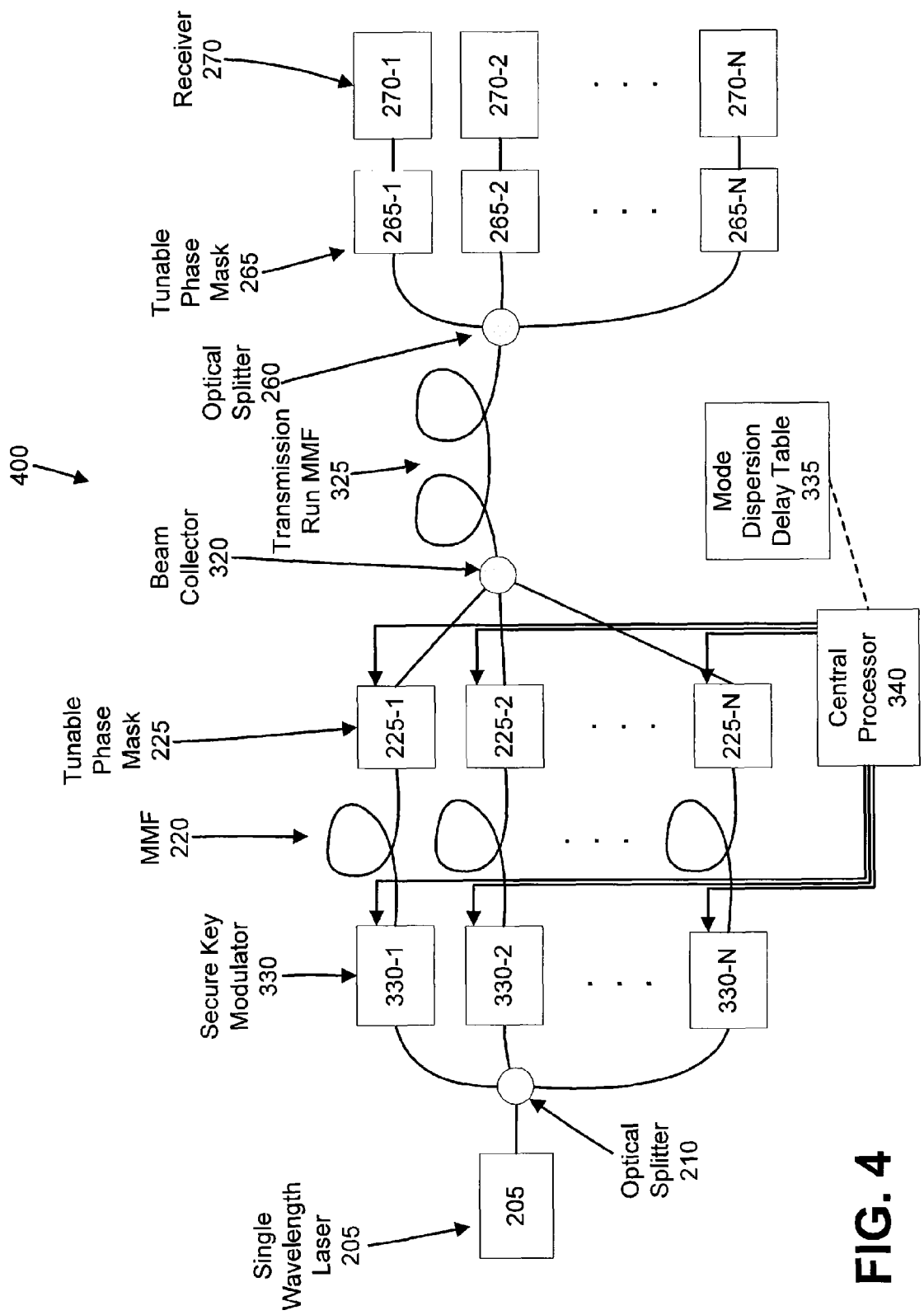
FIG. 4 illustrates an exemplary secure communications system including a mode dispersion delay table and configured to provide enhanced security features.

FIGS. 3 and 4 each illustrate further details and examples of the transmission of signals over MMF in exemplary communications systems.

Without compensating for modal dispersion, the transmission distance over MMF may be severely limited. However, phase masks may be used for general MMF transmission to increase maximum usable distance for an MMF communications system. Through use of a system including phase masks, modal dispersion may not be an issue, because the selected modes may be specifically separated by phase masks before being sent to a receiver. Moreover, phase masks may further be used for multiplexing and demultiplexing multiple signals. Using such an exemplary system, both longer transmission distances and also greater throughput may be achieved than through use of MMF alone without phase masks.

FIG. 3 illustrates an exemplary communications system 300 including multiple SDMKD 215 devices for the propagation of multiple signals over multiple modes. By definition, MMF may support multiple modes of transmission, in some examples up to 18 to 19 mode groups. Although mode group coupling may occur to some degree, mode group coupling is a relatively attenuated phenomenon, and accordingly individual modes may be used separately on a length of MMF with a minimum of crosstalk or interference. Potentially, each mode may carry a separate 2.5 Gbit/sec, 10 Gbit/sec, or 40 Gbit/sec modulated signal. Thus, if the MMF supports 18 modes, and each mode may carry a separate transmission, then 18 "vertical" channels may be provided over a transmission medium using a single wavelength.

Similar to as discussed above with regard to FIG. 2, in FIG. 3 a single wavelength laser 205 may provide a beam of coherent light and be optically coupled to an optical splitter 210, where optical splitter 210 may split the light energy into multiple beams of light.

As illustrated in FIG. 3, system 300 includes four SDMKD 215, namely 215-1, 215-2, 215-3, and 215-4, where each SDMKD 215 is optically coupled to optical splitter 210. Each SDMKD 215 may be used to modulate a specific signal onto a light beam. Although FIG. 3 includes four SDMKDs 215, systems with more or fewer SDMKD 215 modulators are possible.

One or more signal feeds 310 may be selectively coupled to each of the SDMKDs 215, and may provide signals to be modulated onto the light beams by the SDMKDs 215. In some examples, the signal feeds 310 provided to the SDMKDs 215 may be electronic signals, while in other examines the feeds may be provided as optical signals, radio-frequency signals, or by some other technology. Although only one main signal feed 310 is shown, signals may originate from a common signal feed 310 or from multiple separate signal feed 310 sources.

In some examples, each SDMKD 215 may receive a separate signal to modulate. For example, SDMKD 215-1 may modulate a first signal onto a light beam, SDMKD 215-2 may modulate a second signal onto a light beam, SDMKD 215-3 may modulate a third signal onto a light beam, and SDMKD 215-4 may modulate a fourth signal onto a light beam.

Additionally, each SDMKD 215 may use a different modulation, even though each may be optically connected to the same single wavelength laser 205. For example, SDMKD 215-1 may modulate at 10 Gbit/sec, while a second SDMKD 215-2 may modulate at 2.5 Gbit/sec.

Moreover, a SDMKD 215 may modulate a specified type of signal onto the beam. For example, SDMKD 215-1 may modulate a video signal, 215-2 may modulate a voice signal, 215-3 may modulate a data signal, and 215-4 may modulate a signal including secure keys information. In other examples, different types of signal may be modulated, or the same type of signal may be modulated by multiple SDMKD 215 devices. As another example, each of SDMKDs 215-1, 215-2, 215-3 and 215-4 may potentially modulate a different voice signal.

Lengths of MMF 220 may be optically coupled to each SDMKD 215 to propagate the modulated beams according to the modes present in the MMF 220 for the wavelength of light of the beam. As illustrated, SDMKD 215-1 may be optically connected to MMF 220-1, SDMKD 215-2 to MMF 220-2, SDMKD 215-3 to MMF 220-3, and SDMKD 215-4 to MMF 220-4. Each MMF 220 may allow for the modes to form and propagate for the modulated beams. As indicated, signal 1 may be modulated by SDMKD 215-1 and propagated over MMF 220-1, signal 2 may be modulated by SDMKD 215-2 and propagated over MMF 220-2, signal 3 may be modulated by SDMKD 215-3 and propagated over MMF 220-3, and signal 4 may be modulated by SDMKD 215-4 and propagated over MMF 220-4.

A tunable phase mask 225 may be optically coupled to each length of MMF 220. As illustrated, MMF 220-1 may be optically connected to tunable phase mask 225-1, MMF 220-2 may be optically connected to tunable phase mask 225-2, MMF 220-3 may be optically connected to tunable phase mask 225-3, and MMF 220-4 may be optically connected to tunable phase mask 225-4.

Each tunable phase mask 225 may be specifically configured pass only a different particular mode. For example, tunable phase mask 225-1 may be configured to pass only a first mode, tunable phase mask 225-2 may be configured to pass only a second mode, tunable phase mask 225-3 may be configured to pass only a third mode, and tunable phase mask 225-4 may be configured to pass only a fourth mode. The individual modes filtered by the tunable phase masks 225 are merely exemplary, and need not be in order or consecutive. However, it is preferable for each tunable phase mask 225 to pass a unique mode to allow for the modes to be separable and distinguishable at the receiver end.

Accordingly, and as illustrated, each of signals 1 through 4 is filtered by a tunable phase mask 225 and may be propagated solely as the desired mode.

Beam collector 320 may be optically coupled to each of the tunable phase masks 225, such as through optical transmission medium 240. Beam collector 320 may perform energy convergence with the multiple light beams carrying the modulated signals received from each of the tunable phase masks 225. Thus, beam collector 320 may output a combined light beam to transmission run MMF 325, where the combined light beam includes each of the signals 1-4 maintained on the desired individual modes as passed by the tunable phase masks 225-1 through 225-4, from the signals 1-4 modulated by the SDMKDs 215-1 through 4.

Transmission run MMF 325 may be a section of MMF of variable length. Transmission run MMF 325 may in fact be a very short run of MMF, while in other examples transmission run MMF 325 may be a run of MMF of many kilometers. As modal dispersion is not a limit to the propagation distance of the single-modal signals over MMF 325, the length of transmission run MMF 325 may not be limited by modal dispersion, and thus may be a longer run than possible in a system that suffers from modal dispersion issues.

Indeed, similar to with SMF, transmission distance of MMF in such an exemplary system using phase masks may be limited by chromatic dispersion but not by modal dispersion. Accordingly, such a system may propagate up to approximately 65-80 km without the need for any compensators. Moreover, a dispersion compensator may be used to correct for chromatic dispersion (e.g., a tunable dispersion compensator) and achieve even longer transmission distances. Further, because the mode patterns are known, it is possible to perform digital signal processing (DSP) and thus perform error correction on a later received signal.

Although FIG. 3 illustrates an exemplary system wherein four separate modes are propagated onto a transmission run MMF 325, more or fewer modes and signals may be used, depending on the capabilities of the MMF being utilized and of the requirements for the system. For example, if the MMF supports 18 modes, each mode may carry a separate transmission, and then 18 "vertical" channels may be provided using a single wavelength.

In addition to improved range and increased bandwidth as, exemplary system 300 may further provide for increased security over the transmission run MMF 325. For example, if a third party to the communication spliced into the transmission run MMF 325, and if the third party connected a traditional power meter tester to the splice, the power meter would only indicate a single wavelength (e.g. a 1550 nm wavelength on the MMF). Accordingly, the third party may not even be aware that multiple separate signals are being sent across the transmission run MMF 325. Moreover, as the multiple signals are being sent across the transmission run MMF 325 using different modes, the third party may not be able to receive any of the signals without having a phase mask filter. Without use of a phase mask (e.g., tunable phase mask 265) to select a specific mode to decode, all of the signals on the MMF 325 may appear smeared together and unintelligible. Thus, if the third party lacks the proper phase masks, the third party may be unable to separate the signals carried by the various modes and accordingly may only receive a garbage signal. This may provide a level of security to the transmissions over the transmission run MMF 325.

For even greater security, the signals being transmitted on the transmission run MMF 325 may be dynamically switched among the various modes being propagated along the MMF 325. Through use of a mathematical random sequence generator, a secure key may be generated. The secure key may then be used as an input to a mathematical function, where the function may be used to generate a particular sequence. The sequence may be used to selectively switch the signals among the possible modes of transmission. This secure key may be known at the receiver end and may be used to properly decode the signals.

For example, if multiple signals are being propagated in four modes onto one wavelength, the system may use a random sequence to generate a secure key. Initially, a first signal may be modulated onto mode three, a second signal onto mode four, a third signal onto mode one, and a fourth signal onto mode two. Then, using a mathematical function (e.g., implemented on a computing device included in SKMKD 215, implemented on a separate computing device controlling a plurality of SKMKDs 215, etc.) and the secure key, the four signals may be selectively switched back and forth among the available modes.

The receiver end may further be synchronized with the transmission end to allow for the signals to be properly retrieved from the MMF 325, taking into account the selective switching among the modes. In some examples, the receiver end may be synchronized through reception of the secure key from the transmission end, for example propagated from SKMKD 215 to the receiver end on one of the supported modes. Moreover, an updated secure key may be sent to the receiver end from the transmission end, and when the updated key is received, the receiver end may then use the updated secure key to stay synchronized with the transmission end.

Accordingly, such use of a secure key and a mathematical function to selectively switch back and forth among the available modes may add a further level of security. However, if a third party captures the secure key being transmitted, and if the third party knows the mathematical function being used, then the third party may still be able to decode the signals transmitted over the MMF.

Moreover, as different modes propagate at different speeds along a length of MMF, by determining an exact transmission distance of a length of MMF, the secure key may be sent to the receiver in a time-sensitive manner that may not readily be defeated by an interception attacker who does not know the transmission distance. Through this additional level of security, the transmitted signals over the MMF may be further secured from potential third-party eavesdropping.

FIG. 4 illustrates an exemplary secure communications system 400 including a mode dispersion delay table 335 and configured to provide enhanced security features. Like numbered elements of exemplary system 400 previously discussed function similarly to as described above, with secure key modulator 330, mode dispersion delay table 335, and central processor 340 further providing an additional level of security in cooperation with receiver 270.

Generally, higher modes propagate slower in a length of MMF. For example, a fundamental mode may travel fastest, a second mode may travel may travel second fastest, and a third mode may travel third fastest through the MMF (i.e., slower than both the fundamental mode and the second mode). Because of the time delay that the modes take to propagate through the MMF, a signal modulated and propagated down the MMF on a particular mode may arrive at the destination a different amount of time after a signal that was modulated and propagated down the MMF on another mode. The specific propagation rates for the modes may be computed based on the design of the MMF, for example taking into account the coating technology of the MMF and the diameter of the MMF fiber core 110. Accordingly, based on the properties of the MMF, a rate of speed for each mode that propagates down the MMF may be determined. Then, based on the total length of the MMF and the determined rate of speed, the exact time delay (e.g., in picoseconds) may be computed for the transmission delay for each mode propagating along the MMF. This delay may be advantageously used by exemplary system 400.

As illustrated in FIG. 4, transmission delay information for the modes may be included in a mode dispersion delay table 335. Based on the mode dispersion delay table 335, information may be sent at an appropriate time by a secure key modulator 330 to be useful at a receiver 270. Specifically, secure key modulator 330 may determine when information propagated on a mode will be received by a receiver 270 through use of the mode dispersion delay table 335 and knowledge of the length of the transmission run MMF 325. Using this information, modulator 330 may send a secure key to receiver 270, wherein the secure key is to be applied to the decoding at the receiver when received.

A central processor 340 is a computing device that may be configured to access the mode dispersion delay table 335 and to direct the secure key modulators 330 to send a secure key at an appropriate time. The central processor 340 may be configured to direct the secure key modulators 330 to modulate a particular defined data signal. Secure key modulator 330 may be specially configured to be in selective communication with central processor 340, and may be configured to receive and execute directives from central processor 340. For example, central processor 340 may direct the secure key modulator 330 to modulate a signal, or to switch from modulating one signal to modulating another. Additionally, secure key modulator 330 may be directed by central processor 340 to send a secure key for use by a random sequence generator at the receiver 270 end through a particular mode being propagated across the MMF 325. Because the central processor 340 may determine the exact amount of time that it will theoretically take for the secure key to reach the receiver end, the secure key modulator 330 may be configured to send the secure key to the receiver 270 at an appropriate time for the receiver 270 to receive the secure key.

Moreover, central processor 340 additionally or alternatively may be configured to tune or otherwise change the parameters of the specific mode being selectively passed by each tunable phase mask 225. Accordingly, tunable phase mask 225 may be in selective communication with central processor 510, and may be configured to receive and execute directives from central processor 510. These directives may indicate to the tunable phase mask 225 to select from one of a plurality of modes to pass. Thus, central processor 340 may send directives to the tunable phase masks 225 to switch, change, and otherwise manipulate which signal is sent over which of the plurality of modes paths.

Accordingly, because a third party may not know the length of transmission run MMF 325, the third party may not be able to determine when the secure key may be received. Because the third party may not know when the secure key may be received, even assuming the third party may use the secure key to determine the sequence of selectively switching signals among the available modes, the third party may not be able to determine when a signal is to be switched, and accordingly may be unable to decode the signals. As a result, the signal transmissions may remain secure.

In other exemplary systems without a central processor 340, each secure key modulator 330 may include or have access to a mode dispersion delay table 335. In such exemplary systems, the signals being transmitted on the transmission run MMF 325 may be dynamically switched among the various modes being propagated along the MMF 325, where the dynamic switching may additionally be performed taking into account the different propagation delays for the utilized propagation modes.

Figure 5:
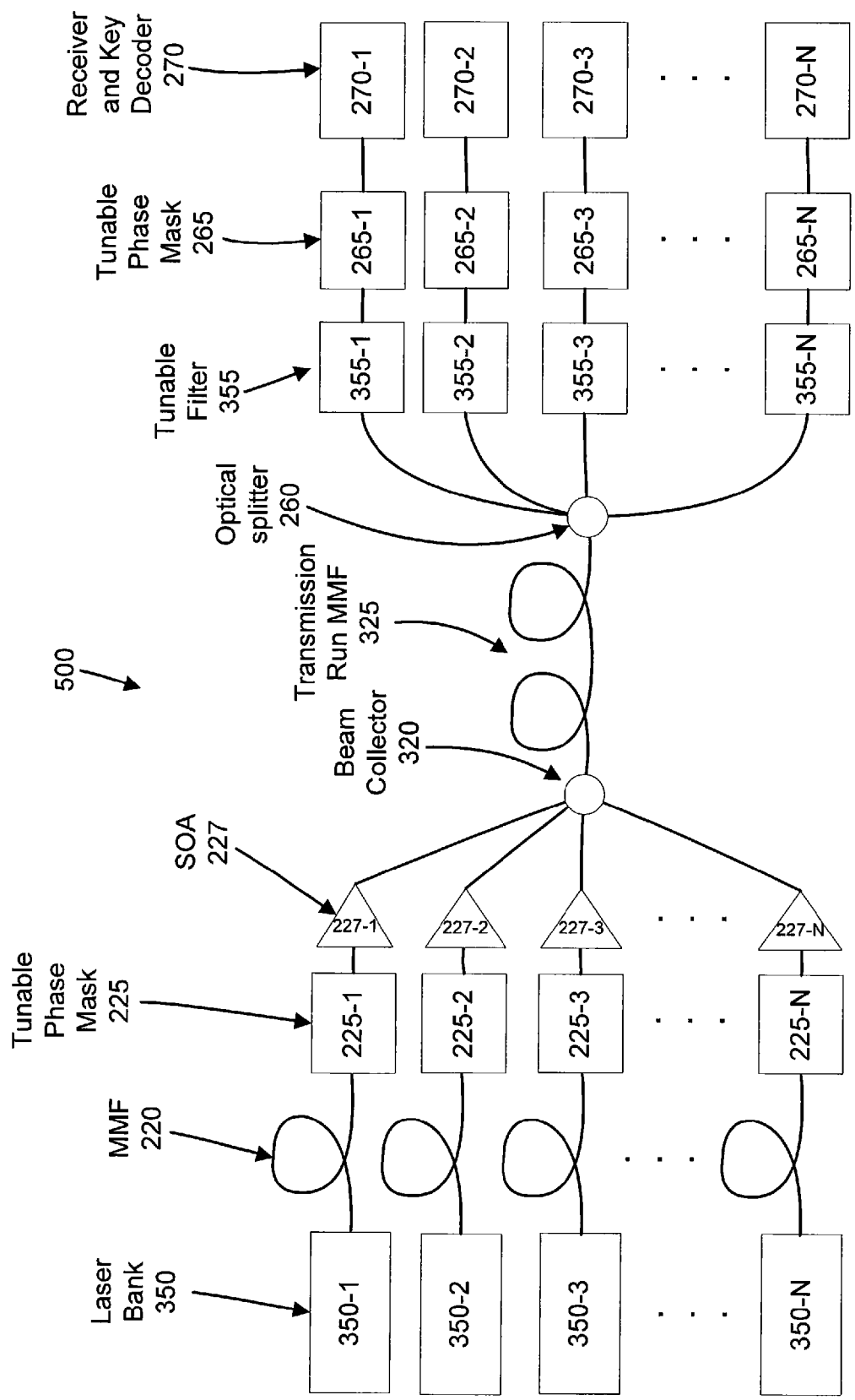
FIG. 5 illustrates an exemplary system including multiple lasers configured for the propagation of multiple signals over multiple modes and wavelengths.

FIG. 5 illustrates an exemplary system 500 including multiple lasers configured for the propagation of multiple signals over multiple modes and wavelengths.

As discussed above, WDM may be performed over MMF using a single wavelength laser and phase masks, allowing for multiple signals to be propagated along a length of MMF through taking advantage of the different modes that propagate along a length of MMF. These signals may be though of as being "vertically" stacked.

Moreover, multiple wavelengths of light may be propagated along the MMF, further increased the bandwidth of the MMF. These additional signals may be though of as being "horizontally" stacked. Through use of both "vertically" and "horizontally" stacked signals, the theoretical bandwidth capacity of a length of MMF may be vastly increased.

FIG. 5 shares many like numbered and similarly functioning elements with FIGS. 2, 3 and 4. However, FIG. 5 further includes multiple laser elements comprising a laser bank 350, and corresponding tunable filter 355 elements to allow for both "vertically" and "horizontally" stacked signals.

Laser 350 may be a single wavelength laser such as laser 205 or may be a tunable laser capable of tuning the laser output within a range or set of possible wavelengths. Laser 350 may further comprise a modulator and support internal modulation; however, in other examples laser 350 may require an external modulator such as SDMKD 215 (not shown in FIG. 5). The system 500 may comprise N lasers, numbered 1 through N, and each laser 350 may be any of the aforementioned types of laser. Moreover, each laser 350 may output a different wavelength, or in the alternative some or all lasers 350 may output the same wavelength.

Similar to as discussed above, MMF 220-1 through MMF 220-N may be optically coupled to lasers 350-1 through 350-N, respectively, and may be configured to receive modulated signals and allow for modes to form and propagate. Tunable phase masks 225-1 through 225-N may be optically coupled to MMF 220-1 through 220-N, respectively, and may be configured to allow only a specific mode of a modulated signal to pass. SOAs 227-1 through 227-N may be optically coupled to tunable phase masks 225-1 through 225-N, respectively, and may be configured to amplify the modal signals due to any possible attenuation. Beam collector 320 may be optically coupled to SOAs 227-1 through 227-N and also to a transmission run MMF 325, and may be configured to combine the plurality of modulated signals for transmission across transmission run MMF 325.

Transmission run MMF 325 may be optically coupled to optical splitter 260, where optical splitter 260 may be configured to split a received signal modulated over a light beam into N legs, wherein each leg includes all the modes and frequencies being propagated.

Each of tunable filters 355-1 through 355-N may be optically coupled to a leg of optical splitter 260, and may be configured to allow a specific wavelength of signal to pass, further allowing for separation of the different wavelengths in a similar manner to the aforementioned separation of the different modes.

Tunable phase masks 265-1 through 265-N may be optically coupled to tunable filters 355-1 through 355-N, respectively, and may be configured to allow only a specific mode of the modulated signal to pass.

Finally, phase masks 265-1 through 265-N may be optically coupled to receivers 270-1 through 270-N, respectively, where each signal for the selected mode and wavelength may be individually decoded into the originally transmitted signal by a corresponding receiver 270.

Figure 6:
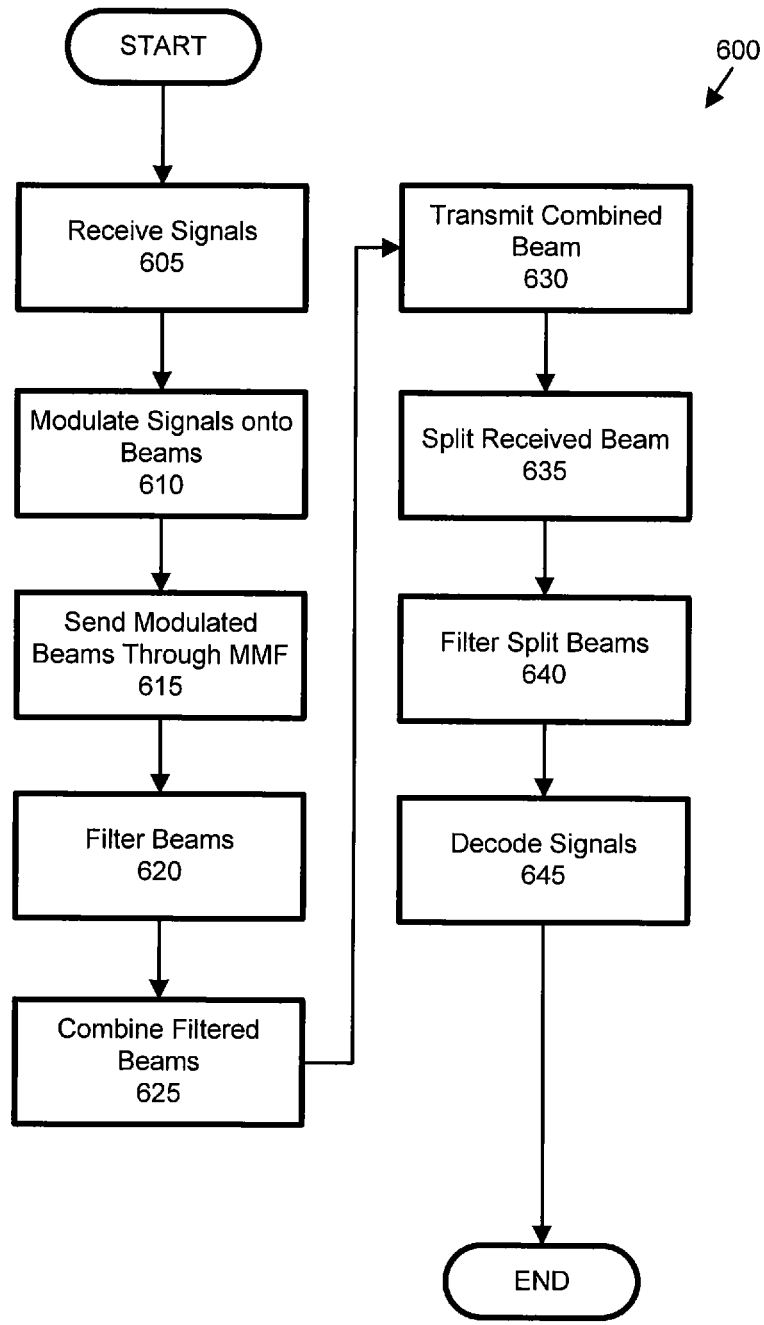
FIG. 6 illustrates an exemplary process for high security communication over a multi mode fiber waveguide.

FIG. 6 illustrates an exemplary process 600 for high security communication over a multi mode fiber waveguide. Process 600 may begin in step 605, wherein one or more signals are received by the system for transmission. For example, one or more signal feeds 310 may carry a plurality of signals for transmission.

Next, in step 610, each SDMKD 215 modulates a signal onto a corresponding received light beam. For example, one or more of the signal feeds 310 may be selectively coupled to each of a plurality of SDMKDs 215, wherein each SDMKD 215 may be used to modulate a specific signal onto a coherent light beam provided to the SDMKD 215 by a laser 205. In some instances some or all of the SDMKD 215 may receive light beams of the same wavelength, such as from multiple lasers of the same wavelength or from an optical splitter 210 receiving a light beam from a laser 205 and outputting to multiple SDMKDs 215. Moreover, in some examples, the signal feeds 310 provided to the SDMKDs 215 may be electronic signals, while in other examines the feeds may be provided as optical signals, radio-frequency signals, or by some other technology. Accordingly, each SDMKD 215 may modulate a signal onto the corresponding received light beam.

Next, in step 615, each SDMKD 215 sends a modulated beam through a length of MMF. The lengths of MMF 220 may be optically coupled to each SDMKD 215 and may propagate the modulated beams according to the modes present in the MMF 220 for the wavelength of light of the beam.

Next, in step 620 each beam is filtered by a tunable phase mask 225. For example, a tunable phase mask 225 may be optically coupled to each length of MMF 220, where each tunable phase mask 225 may be specifically configured to pass only a different particular mode. In some examples, each tunable phase mask 225 may pass a unique mode for a utilized wavelength to allow for the modes to be separable and distinguishable at the receiver end.

Next, in step 625, the filtered beams are combined for transmission. For example, a beam collector 320 may be optically coupled to each of the tunable phase masks 225, such as through optical transmission medium 240, where the beam collector 320 may perform energy convergence with the multiple light beams carrying the modulated signals received from each of the tunable phase masks 225.

Next, in step 630, the combined beam is transmitted to a receiver. For example, beam collector 320 may output a combined light beam to a transmission run MMF 325, where the combined light beam includes each of the signals maintained on the desired individual modes as passed by the tunable phase masks 225. Accordingly, as multiple signals may be sent across the transmission run MMF 325 using different modes, a third party attempting an interception not be able to receive any of the signals without having the proper phase masks. Moreover, the third party may not even be aware that multiple separate signals are being sent across the transmission run MMF 325, and may merely see all of the signals on the MMF 325 smeared together and unintelligible.

Next, in step 635, the received beam is split for filtering and decoding. For example, an optical splitter 260 may be optically coupled to the transmission run MMF 325 and may split the received beam into a plurality of legs, wherein each leg includes all the modes and frequencies being propagated.

Next, in step 640, each split beam is filtered into a component mode for decoding. For example, each leg of the optical splitter 260 may be optically coupled to a tunable phase masks 265 corresponding to one of the selected modes being transmitted. In examples where multiple wavelengths of laser are being utilized, the plurality of tunable phase masks 265 may further be coupled to tunable filters 355 to allow for filtering according to both a specific wavelength and mode to be decoded.

Next, in step 645, a transmitted signal is decoded from each filtered beam. For example, each tunable phase mask 265 may be optically coupled to one of a plurality of receivers 270, wherein each signal for a filtered selected mode (and optionally wavelength) may be individually decoded into an originally transmitted signal. Next, the process 600 ends.

FIG. 7A illustrates an exemplary process providing further details of step 610 of process 600 regarding modulating signals onto corresponding modes.

In step 705, a secure key is determined. For example, the secure key may be generated through use of a mathematical random sequence generator. In other examples, the secure key may be known without requiring a new secure key to be generated.

Next, in step 710, a transmission sequence is generated. For example, the secure key determined in step 705 may then be used by a mathematical function to generate a particular sequence. In some examples, the mathematical function may be executed by a central processor 510.

Next, in step 715, which signals to transmit over which modes is determined. For example, each SDMKD 215 may modulate a signal from among one or more signal feeds 310 onto a corresponding received light beam. The transmission sequence generated in step 710 may be used to determine which signal or signals from the one or more signal feeds 310 discussed above with regard to step 610 to modulate onto the corresponding beam for each SDMKD 215. Additionally or alternately, the transmission sequence may be used to determine which mode to selectively pass by the tunable phase masks 225. Further, the transmission sequence may be used to selectively switch which signal from among one or more signal feeds 210 to modulate onto the corresponding beam for each SDMKD 215. Accordingly, the plurality of signals may be selectively switched among the possible mode paths of transmission. Next, process 700A ends.

FIG. 7B illustrates an exemplary process providing further details of step 645 of process 600 regarding decoding signals from received modes.

In step 750, a secure key is determined. In some examples, the secure key may be known by the receiver/decoder end. In other examples, the secure key may be sent to the receiver/decoder end through one of the mode paths. As with the other signals switched among the mode paths, the secure key signal may additionally be switched from one path to another.

Next, in step 755, a reception sequence is generated. For example, the secure key determined in step 750 may then be used by a mathematical function to generate the particular reception sequence. In some examples, one or more RKDs 270 may generate the reception sequence.

Next, in step 760, which modes to restore as which signals is determined. As discussed above, the transmission sequence may be used to selectively switch which signal or signals from among one or more signal feeds 310 to modulate onto the one or more corresponding beams. Similarly, the reception sequence may be used to determine which signal or signals from among the one or more signal feeds 310 was modulated onto which received modes. Through use of the reception sequence, the receiver end may properly determine which signal is carried by which mode and may accordingly decode the received signals. Next, process 700B ends.

In general, computing devices may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of well known computing devices, including, without limitation, a computer workstation, a desktop, notebook, laptop, or handheld computer, or some other known computing device.

Computing devices generally each include instructions executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any tangible medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.).

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
 a laser configured to produce a laser beam;
 an optical splitter optically coupled to said laser and splitting said laser beam received from said laser into a plurality of laser beams;
 a modulator optically coupled to one of said plurality of laser beams and a second modulator operating in parallel with said modulator and optically coupled to another of said plurality of laser beams;
 a length of multi-mode fiber optically coupled to said modulator at the proximal end of said fiber and a second length of multi-mode fiber optically coupled to said second modulator at the proximal end of said second fiber; and
 a phase mask optically coupled to the distal end of said fiber and filtering out modes propagating through said fiber other than a selected mode and a second phase mask operating in parallel with said phase mask and optically coupled to the distal end of said second fiber and filtering out modes propagating through said second fiber other than a second selected mode, said second selected mode differing from said selected mode.

2. The system of claim 1, wherein said each of said phase mask and second phase mask matches an intensity distribution for the respective selected mode field of distribution, wherein said filtering is performed by allowing through a signal only according to said intensity distribution for said respective selected mode.

3. The system of claim 1, further comprising:
a transmission medium;
a first optical alignment device optically coupled to said phase mask and configured to direct said one of said plurality of laser beams into an input to said transmission medium at an incident angle corresponding to said selected mode; and
a second optical alignment device optically coupled to said second phase mask and configured to direct said other one of said plurality of laser beams into said input to said transmission medium at an incident angle corresponding to said second selected mode.

4. The system of claim 3, further comprising a third phase mask optically coupled to an output of said transmission medium and configured to filter out modes other than said selected mode.

5. The system of claim 4, further comprising a receiver optically coupled to said third phase mask,
wherein said modulator is further configured to modulate a signal onto a laser beam received from said laser; and
wherein said receiver is configured to receive said laser beam and to decode said modulated signal.

6. A system, comprising:
a laser,
an optical splitter optically coupled to said laser and configured to split a laser beam received from said laser into a plurality of laser beams;
a plurality of signal modulators optically coupled to the optical splitter, each said modulator configured to operate in parallel with one another to:
receive a laser beam from said splitter and an signal to modulate, and
modulate said signal onto said laser beam;
a plurality of lengths of multi-mode fiber, each said fiber optically coupled at the proximal end to one of said plurality of signal modulators; and
a plurality of phase masks, each said phase mask optically coupled to the distal end of one of each of said fibers and configured to operate in parallel with one another.

7. The system of claim 6, wherein each said phase mask is configured to filter out modes other than a mode unique to said phase mask.

8. The system of claim 6, further comprising a second optical splitter, said second optical splitter being optically coupled to at least a subset of said phase masks and configured to perform energy convergence on a plurality of light beams received from said coupled phase masks and output a combined light beam.

9. The system of claim 8, further comprising:
a transmission medium including an input and an output and configured to facilitate transmission from said input to said output; and
a third optical splitter configured to split said light beam into a plurality of legs;
wherein said input to said transmission medium is optically coupled to said second optical splitter and said output of said transmission medium is optically coupled to said third optical splitter.

10. The system of claim 9, further comprising:
a second plurality of phase masks, each of said second plurality of phase masks optically coupled to a leg of said plurality of legs and configured to filter out modes other than a selected mode; and
a plurality of receivers, each of said plurality of receivers optically coupled to one of said plurality of phase masks and configured to decode a signal modulated on a received light beam into a resultant signal;
wherein each phase mask in said plurality of phase masks optically coupled to the distal end of each said fiber has a paired corresponding phase mask in said second plurality of phase masks, the two said phase masks in said corresponding pair each being configured to filter out the same modes other than a selected mode.

11. The system of claim 6, further comprising a central processor in selective communication with said plurality of signal modulators and configured to direct said signal modulators to selectively switch the modulated signals among the possible modes of transmission;
wherein each said signal modulator is configured to modulate one of a plurality of signals and to receive a signal from said central processor indicating which signal to modulate.

12. The system of claim 11, further comprising a mode dispersion delay table comprising transmission delay information for at least a subset of the modes capable of being propagated by said fiber;
wherein said central processor has access to said mode dispersion delay table, and wherein said central processor is configured to direct one of said plurality of signal modulators to send a secure key at a particular time determined according to: (i) said mode dispersion delay table, (ii) a mode over which said secure key is to be sent, and (iii) a known length of a transmission medium.

13. A system, comprising:
a plurality of lasers;
a plurality of signal modulators, each of said modulators optically coupled to one of said plurality of lasers and configured to operate in parallel with one another to:
receive a laser beam from said one laser and a signal, and modulate said signal onto said received laser beam;
a plurality of lengths of multi-mode fiber, each said fiber optically coupled at a proximal end to one of said plurality of signal modulators;
a plurality of phase masks optically coupled at a distal end to each said fiber, each said phase mask configured to operate in parallel with one another to filter out modes other than a selected mode;
an optical splitter, said optical splitter being optically coupled to at least a subset of said phase masks and configured to:
perform energy convergence on said plurality of light beams comprising modulated signals received from said coupled phase masks, and
output a combined light beam;
a transmission medium optically coupled at the proximal end to said optical splitter and configured to receive and propagate said combined light beam;
a second optical splitter optically coupled to the distal end of said transmission medium and configured to split said light beam into a plurality of legs;
a plurality of tunable filters, each said tunable filter optically coupled to a leg in said plurality of legs and configured to filter out wavelengths other than a selected wavelength;
a second plurality of phase masks, each of said second plurality of phase masks optically coupled to a tunable filter and configured to filter out modes other than a selected mode;

and a plurality of receivers, each of said receivers being optically coupled to a phase mask and configured to decode a received light beam into a resultant signal.

14. A system, comprising:

an optical splitter optically coupled to a laser and configured to split a laser beam received from said laser into a plurality of laser beams;

a plurality of signal modulators optically coupled to the optical splitter, each said modulator configured to operate in parallel with one another to:
  receive a laser beam from said splitter and an signal to modulate, and
  modulate said signal onto said laser beam;

a plurality of lengths of multi-mode fiber, each said fiber optically coupled at the proximal end to one of said plurality of signal modulators;

a plurality of phase masks, each said phase mask optically coupled to the distal end of one of each of said fibers and configured to operate in parallel with one another;

a transmission medium; and a plurality of optical alignment devices, each said optical alignment device optically coupled to one of said phase masks and configured to operate in parallel with one another to direct said laser beams into an input to said transmission medium.

\* \* \* \* \*